(No Model.) 2 Sheets—Sheet 1.
C. M. HUSON.
CABLE TRAMWAY.
No. 312,273. Patented Feb. 17, 1885.
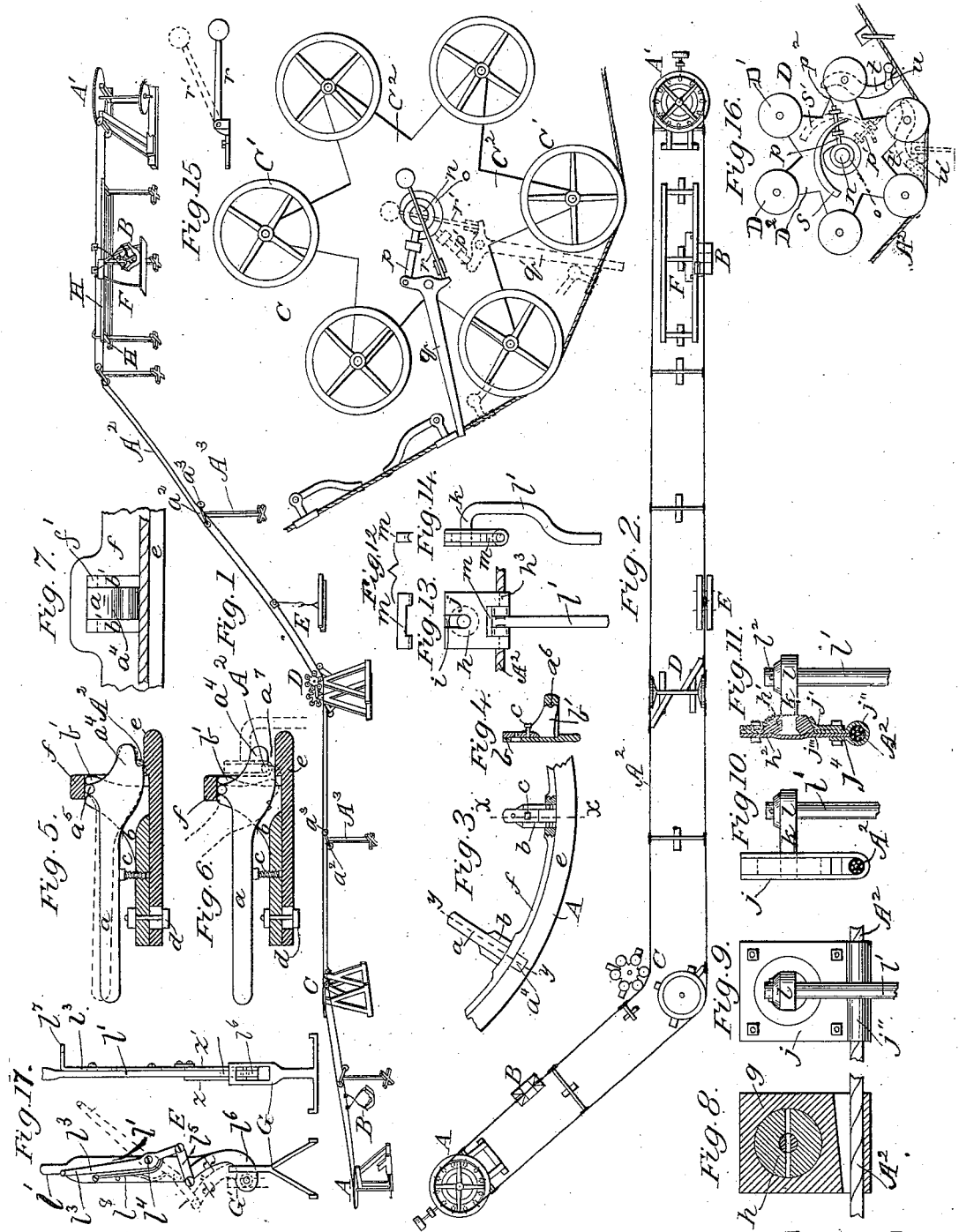
Witnesses:
Inventor.

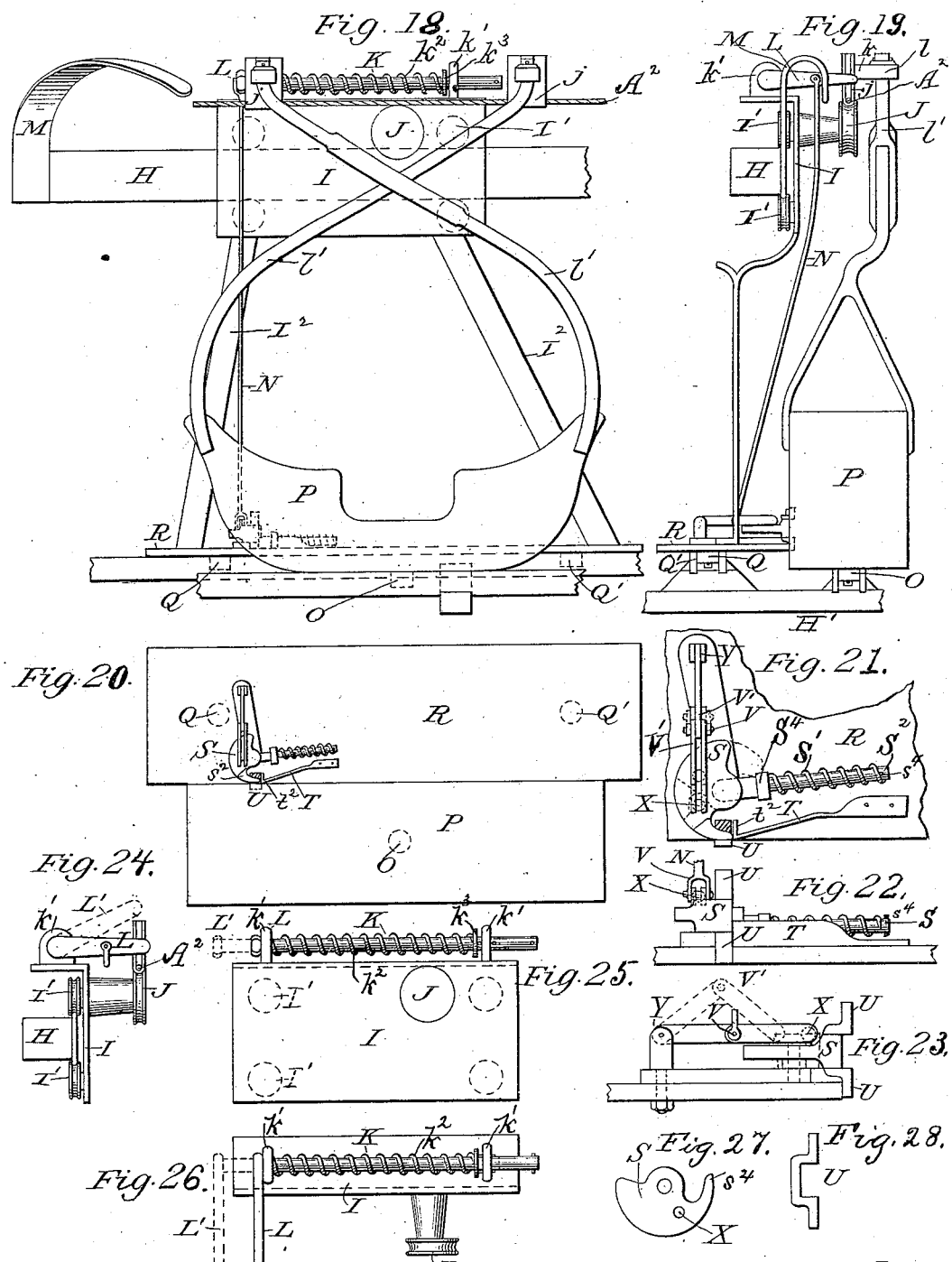

UNITED STATES PATENT OFFICE.

CHARLES M. HUSON, OF SOUTH PUEBLO, COLORADO.

CABLE TRAMWAY.

SPECIFICATION forming part of Letters Patent No. 312,273, dated February 17, 1885.

Application filed August 27, 1883. (No model.)

*To all whom it may concern:*

Be it known that I, CHARLES M. HUSON, of the city of South Pueblo, State of Colorado, have invented a certain new and useful Improvement in Cable Tramways for the purpose of carrying or transporting passengers and freight over rough, rugged, and mountainous countries, of which the following is a full, clear, and exact description, reference being had to the accompanying drawings, forming a part of this specification.

Figure 1 is a perspective view showing the general features and relations of the parts of a tramway embodying my improvements. Fig. 2 is a top plan view of that shown in Fig. 1. Fig. 3 shows in top plan a portion of the rim and flange of one of the terminal wheels, together with some of the gripping devices carried thereby. Fig. 4 is a section on the line $x\,x$, Fig. 3. Fig. 5 is a section on the line $y\,y$, Fig. 3, the parts, however, being shown on a larger scale than in Fig. 3. Fig. 6 is a sectional view, similar to that in Fig. 5, except that by dotted lines are shown the positions of one of the carrier-clips and of the gripping devices at the time the former is passing the latter. Fig. 7 is an end view of the devices shown in Fig. 5, looking toward the center of the wheel. Fig. 8 is a section on a plane parallel to the cable of a clip for supporting the carrier. Fig. 9 is a face view of another form of clip. Fig. 10 is an edge view of the clip shown in Fig. 8. Fig. 11 is an edge view of the clip shown in Fig. 9. Fig. 12 shows in face and in end view a ferrule or block used in the clips which are employed at the points of junction of the ends of the cable. Fig. 13 is a view from the inside of a clip of the character last mentioned, it being provided with devices whereby it can be utilized to support the carrier. Fig. 14 is a rear edge view of the clip in Fig. 13. Fig. 15 is a top view of the devices employed to support and guide the cable at points where it makes a bend in a horizontal plane. Fig. 16 is a side view of devices for a similar purpose at points where the cable makes bends in a vertical plane. Fig. 17 shows in side view and in edge view the means for automatically releasing a crate or other object from one of the pendants or carrier-arms. Fig. 18 is a side view showing a portion of a movable platform, together with the car which carries it, a track for the car, a cab or carriage carried by the cable and adapted to be temporarily engaged with the movable platform, the devices for automatically engaging the car with the cable and disengaging it therefrom, and also devices for connecting the cab or carriage with the platform and car and disconnecting them therefrom. Fig. 19 is an end view of that shown in Fig. 18. Fig. 20 is a top view of the movable platform and of the bottom of a cab or carriage when connected with said platform. Figs. 21, 22, 23, 24, 25, 26, 27, and 28 are detailed views of the various parts employed to effect the engagement of the cable cab or carriage with the movable platform, and also effect the disengagement therefrom.

In the drawings, $A^2$ represents, generally, the cable, which may be of any preferred material, though for most purposes use is made of the metal cables now commonly in use. This may be made of one or more sections, the ends of which are brought together and firmly secured by devices to be hereinafter fully described, so as to form a continuous traveling carrier moving from one to the other of two terminal points or stations, indicated at A A'. Between these terminal stations the cable is supported upon any suitable anti-friction devices which will permit the passage of the carriers to be described. For this purpose use may be made of upright isolated poles $A^3$, arranged at proper intervals, and having cross-bars $a^2$, provided with anti-friction supporting rollers or pulleys $a^3$.

I will first describe the means which I have devised for effecting the proper passage of the cable around the wheels at the terminal points or stations, these being so arranged as to provide an automatic grip upon the cable, and also so as to allow the free passage of the clips which support the carriers below the cable.

Referring to Figs. 3, 4, 5, 6, and 7, A represents, generally, the wheel at the terminal point or station, it having a horizontal flange, $e$, and an upwardly-rising rim, $f$. The flange or annular part $e$ of the wheel may extend part way toward the center and be carried by spider-arms, or may be made solid from center to circumference, as circumstances demand. In the rim $f$ there are apertures, as shown at $f'$.

$b\ b'$ represent a frame, there being one of these secured to the wheel at each of the apertures $f'$. It is fastened in place by one or more bolts, as at $d$, and the upwardly-extending plates or arms $b'$ are situated in the aperture $f'$. A gripping-lever $a\ a^4$ is pivoted in the frame $b\ b'$ by means of trunnions $a^5$, which are seated in recesses in the upper ends of the arms $b'$, as shown at $a^6$, Fig. 4. The outwardly-projecting part $a^4$ of the gripping-lever is somewhat enlarged, and is provided with a rabbet at $a^7$, in which the cable $A^2$ can be seated. The part $a$ of the lever extends inwardly, and operates by its gravity to prevent the part $a^4$ from being thrown down except when the movement of the various parts require it.

To regulate the downward throw of the gripping-lever, an adjusting-screw, $c$, is inserted into the upper face of plate $b$, it being in the plane of the arm $a$, so that by means of it the movement of the arm can be regulated.

The carriers or supporting devices which are attached to the cable are each provided with one or more clips firmly secured to the cable.

In Figs. 8 and 10 a clip is shown having a metallic block, $g$, situated directly above the cable, and provided with a circular aperture at or near the central portion, the axis of the aperture being transverse to the cable.

$h$ is a wheel or disk fitting snugly in the aperture in the block or plate $g$, and $k$ is a stud or short shaft secured centrally to the wheel or disk $h$, and projecting outwardly to a suitable distance outside of the cable.

$j$ is a band or plate one part of which lies upon the rear side and the other upon the front side of the block or plate $g$, it (the band or plate $j$) having a loop at the bottom, which passes under the cable $A^2$ and the plate upon the front side, having an aperture of about the diameter of the stud or shaft $k$, so that the latter can pass through the plate and turn freely.

$l$ is an eye at the outer end of the stud or shaft $k$, and $l'$ is a pendant or bar hanging from the shaft $k$, the upper end of this bar or pendant $l'$ passing through the eye at $l$, and being provided with a pin at $l^2$, or collar or other suitable retaining device.

When the band or plate $j$ is bolted in place, it, together with the block or plate $g$, the wheel or disk, the stud or shaft $k$, and the pendant or arm $l'$ are all clamped firmly together; although it will be seen that at the same time the wheel or disk $h$ and its stud or shaft $k$ can rock or move about the axis of the shaft $k$, so that at places where the cable is inclined relatively to the horizon the pendant or bar $l'$ will be permitted to preserve a vertical position, and, owing to the loose connection between the parts $l'$ and $k$, the pendant or bar $l'$ can turn or rock upon its axis relatively to the shaft $k$, which rocking or movement is necessary under certain circumstances when it (the pendant or arm $l'$) is moving around a bend or angle of the cable in a horizontal plane, as will be more fully described.

In Figs. 9 and 11 I have shown a slightly modified form of clip for attaching the pendant or arm to the cable, which, for some reasons may be found superior to that above described. In this case use is made of three sheets or plates of metal, respectively represented at $j'\ j^2\ j^3$, that at $j'$ lying toward the pendant $l'$ and being provided with an aperture and a conical or flaring rim or wall around the aperture, as shown at $h^2$. The plate $j^3$ forms the back wall of the clip, it extending from the top thereof down to a line in proximity to the cable.

Between the plates $j'$ and $j^3$ there is arranged a third one, $j^2$, which extends from the top down to the cable and around the latter, it being bent or shaped to have a loop or sleeve, which will fit tightly around the cable. This plate $j^2$ has an aperture concentric with the aperture in the plate $j'$, and has also an upwardly-projecting lip, $j^4$, adapted to lie behind the plate $j^3$ and be firmly bolted thereto, as shown clearly in Fig. 11.

$h'$ is a beveled wheel or disk corresponding in function to the wheel $h$ in Fig. 8. The wheel fits snugly but loosely within the conical or flaring rim at $h^2$, the inner edge of the wheel lying within the aperture formed in the plate $j^2$.

$k$ is a stud or shaft corresponding to that above described, it being secured to and rocking with the wheel or disk $h'$ and carrying loosely a pendant or arm, $l'$.

It will be seen that in either of the cases above described the parts $h$ or $h'$ operate as an expanded bearing for the stud or shaft. This may be more or less modified without departing from the spirit of the invention in this respect, and therefore I do not wish to be limited to the exact form shown so long as the parts used come within the scope of this expanded bearing or support. Results more or less advantageous could be secured if the stud or shaft be joined with the clip without this expanded bearing; but a firmer support is provided, and it is therefore under many circumstances more advantageous than the simple journal on the shaft.

In Figs. 13 and 14 I have shown another modified form of clip, it being especially adapted for use at the point where two opposing ends of the cable are to be joined. At the bottom of the clip it is recessed, leaving two downwardly extending loops, as at $h^3$, Fig. 13. The ends of the cable are respectively passed through these loops, and the strands thereof are separated or expanded and fastened by solder or secured in any other suitable way, and a ferrule or block, $m$, (shown detached in Fig. 12,) is inserted. In this case the pendant or arm $l'$ and the stud or shaft $k$ are made integrally or secured rigidly together. For some reasons a clip similar to that shown in Figs. 8, 9, and 10, or Figs. 13 and 14, is to be preferred ordinarily—that is to say, one having a main central plate provided with a through-aperture adapted to have inserted therein a loosely-mounted rocking arm at the upper end of a hanger, in combination with a thin clamping-band which surrounds the cable, and has both ends bolted or riveted to the said main central plate, whether the expanded bearing or wheel $h$ be used or not. I can bring the journal of the rocking part directly above the line of support—that is, directly above the cable—where it can be held with least resistance to the necessary motions, and by the comparatively wide thin clamping-plate I preserve the well-known advantage incident to such a clamping-plate.

I do not claim, broadly, a wide thin clamping-plate on the one hand, or, on the other hand, a clip having the main supporting-plate with a transverse aperture for journaling therein the upper end of a hanger; but I believe myself to be the first to have produced a clip or clamp having all of the advantages incident to the one shown.

The pendant or arm $l'$, which is carried by the clip in one or another of the modes above described, may, at its lower end, be provided with any suitable carrier, and have the latter attached thereto in any suitable way.

I have shown in the drawings a pendant or hanger adapted to transport a detachable carrier and to automatically release it at any point where it is desirable to do so, though the other parts of the invention are not to be limited to this special style of pendant and carrier.

Referring to Fig. 17, the pendant or arm $l'$ is shown as being provided with a lever, $l^3$, pivoted at $l^4$, the pivot being at some distance above the lower end. The lower end of the pendant or arm $l'$ is formed into a hook-arm, $l^6$, and by the side thereof are one or more hooks, as shown at $z\ z'$, the latter being pivoted to the stationary hook at $G'$. The upper ends of the hooks $z\ z'$ are connected with the lower end of the lever $l^3$ by a link, $l^5$. G represents a crate or carrier having a loop or other device thereon by which it can be hung upon the hooks $l^6$ and $z$, and adapted to carry lumber or any other material which it is desired to transport by the cable. At the upper end of the lever $l^3$ there is an outwardly-projecting arm, $l^7$, adapted to engage with some stationary stop along the path of the cable.

$l^8$ is a spring, so arranged as to tend to keep the lever $l^3$ in the position shown in full lines in Fig. 17.

If at points where it is desired to automatically unload the carrier a stationary stop be so constructed as to be struck by the arm $l^7$, the lever $l^3$ will be thrust into the position shown in dotted lines, Fig. 17, and it, through the medium of link $l^5$, throws forward the hooks $z\ z'$ (see dotted lines at $z''$) in such manner as to slide off the loop or hook from which the crate or detachable carrier is suspended, so that the latter will be dropped. Immediately after the arm $l^7$ escapes from the stationary stop the spring $l^8$ will again return the parts into the position shown in full lines, Fig. 17.

In Figs. 15 and 16 are shown the means by which the cable is supported and guided at the points where it makes bends.

Referring to Fig. 15, C represents, generally, a set of anti-friction guide wheels or sheaves, together with a spider or support by which they are all mounted upon a common axis, the wheels or sheaves being shown at C', the spider or support at $C^2$, and the shaft upon which they are held at $n$.

I do not wish to be limited to any special form of mechanism for supporting the pulleys or sheaves. As shown, it consists of a plate having radiating arms, to the outer end of each of which one of the wheels C' is pivoted. In practice, however, use may be made of a skeleton frame or other suitable device. The spider and the sheaves are free to rotate about the shaft $n$, except when they are positively locked. This locking can be effected by means of a stop carried by the shaft and an opposing stop carried by the spider or supporting-frame. As shown, the stop secured to the shaft consists of a gradually-widening guide or cam-like collar, $o$, having a square end or shoulder at its widest part.

$p$ is a bolt mounted in an eye or gib on the spider, it moving toward and from the shaft $n$ on substantially radial lines, and having its inner end so arranged as to lie in the plane of the shoulder on the stop $o$. It (the bolt $p$) is moved out and in by means of a rocking lever, $q$, pivoted to the spider or supporting-frame, and having two short arms, one extending toward and pivoted to the bolt $p$, and the other extending in the opposite direction. When the lever $q$ is moved properly, bolt $p$ is drawn out away from the stop $o$, after which the spider can revolve. By means of a spring or weighted lever, as at $r$, engaging with the second short arm of the lever $q$ an inward pressure can be exerted upon the bolt $p$—that is to say, a pressure tending to bring it into engagement with the shoulder on stop $o$. The distance between the wheels may be substantially equal to that between the clips on the cable successively, and the parts are so arranged relatively to each other that before a clip can strike any of the sheaves C' it shall come in contact with the lever $q$ and release the spider from the shaft to permit it, together with the whole series of shafts, to revolve.

In Fig. 16 there is shown in face view a mechanism substantially similar to that above described for supporting and guiding the cable at a point where it bends in a vertical plane. In this case D represents, generally, the whole mechanism, there being pulleys or sheaves D', carried by a spider or supporting-frame, $D^2$, mounted upon a shaft, $n$, having a stop, $o$, the spider or supporting-frame having a sliding bolt, $p$, guided by one or more gibs or eyes.

$t$ is a lever pivoted to the spider, and its inner end connected to the bolt $p$ by a link, as shown at $p^2$, Fig. 16. At the outer end of this lever $t$ there is a swinging bar or stirrup, $u$, pivoted to the lever and carrying an anti-friction roller, the parts being so related that as the clips on the cable approach the spider or supporting-frame, they move in the path of the roller and the bar or stirrup $u$, and if the lever is in the proper position its outer end will be thrust toward the center, as shown in dotted lines in Fig. 16, which results in the pulling outward of the bolt $p$ and an unlocking of the spider or supporting-frame, which, after being unlocked, will revolve about its shaft $n$, the rotation being effected by the engagement of the clip with the roller and the bar or stirrup $u$.

$s$ is a weighted lever, preferably curved substantially as shown, it being bolted to the spider or supporting-frame in such manner that its free or heavier end tends at the proper time to bring the bolt back into such position as to engage with the shoulder on the stop $o$. In either of these constructions—that is to say, that in Fig. 15 or that in Fig. 16—use may be made of two or more stops and two or more levers and bolt-moving mechanisms, as may be desired, though for ordinary purposes I have found that one in combination with each spider or sheave support is sufficient.

I am aware of the fact that a grooved pulley has been used heretofore at the bend in a cable, said pulley having a segment or portion cut out or omitted from the periphery inward toward the center, and having in the open space a supplemental smaller pulley mounted, in combination with a lock to intermittently stop the rotation of the larger pulley, the lock being supported independently of said pulleys.

By following the method which I indicate, the clips or buckets or other objects carried by the cable can be placed very close together and yet so related in position that they shall nowhere come in contact with the guiding devices. Moreover, the cable passes around the guide with much less resistance, the supplemental pulleys upon the guide-frame insuring that any variations in the motion of the cable, or any sudden forward or back movements thereof, shall not affect the main guide-frame. The other advantages incident to a guide of the character which I have shown, however, are independent of this last-mentioned, namely, the lessening of the friction or resistance—that is to say, it will be seen that, broadly speaking, in my case, the rope is carried or supported by means of what may be considered projections extending outwardly from the central portion. To be sure I prefer to mount upon the projections anti-friction devices in the form of loosely-mounted supports for the cable, but for other purposes than providing anti-friction these may be dispensed with, the invention in this respect consisting, as said above, in having a series of two or more projections extending outwardly from the central portion with a corresponding series of vacant spaces between the projections for the reception of the clips, hangers, or other obstructions carried by the cable.

By examining the drawings it will be seen that when the cable is at the bends, supported by devices of substantially the character which I have shown, the angle between the strands can be as small as or smaller than a right angle. Notwithstanding this sharpness of the bend that can be made, there will not be any slackness caused in the cable at the times when the latter is received by the pulleys or projections, one after another, on the guiding and supporting device. Again, a guiding and supporting device of this sort can be used, as said above, where the cable makes a vertical bend, as well as where the angle is horizontal. All of the parts of the lock or stop are situated within the outermost circle described by any of the revolving parts and differ materially from those heretofore used in which essential parts of the lock were supported outside of said circle, and therefore necessitated a separate frame-work to carry the lock. Such a means of stopping or locking the revolving parts would be especially impracticable when the bend is in a vertical plane, inasmuch as the lock and the parts for supporting it would be in the way of the pendant and carriers below the cable.

By examining Fig. 16 it will be seen that the lever or arm $t$, which unlocks the rotating guide, moves in planes substantially parallel with the clip, the latter in the construction shown being vertical. The clip is comparatively thin, as is also the lever—that is to say, of small dimensions on lines transverse to the path of the clip. It will also be seen from said figure that the roller and its support carried by the lock-opening arm constitute a projection transverse to the path of the clip, and, therefore, there is more assurance that the clip shall engage with the lock-releasing arm than would be the case if a plain, flat, or thin lever were alone depended on. Such a lateral projection becomes important, as will be readily understood, when the guide at the bend of the cable moves in planes parallel with the plane occupied by the clip, the figure last referred to showing their relative positions when the clip and guide are both vertical.

I will now describe the devices by means of which the cabs, carriages, or carriers attached to the cable may be loaded either with freight or passengers without stopping the cable for that purpose.

By referring to Fig. 18 it will be seen that the cab or carrier which is used for the transportation of persons is supported by two clips, which in detail are substantially similar to those above described, and shown in Figs. 8 and 10 or 9 and 11.

In the construction shown in Fig. 18 the pendants or downwardly-extending arms $l'$ are crossed and forked at their lower ends, and secured respectively to the ends of a cab or carriage, P. This cab or carriage, therefore, is being constantly moved by the cable. In order to facilitate the loading or unloading thereof without stopping the cable, I employ the following devices:

H H, Figs. 1, 18, and 19, represent the rails of a track, there being in the construction shown in Fig. 1 but one of these tracks, and that being situated near the terminal point or station A'. This track may be of any suitable length, and one of this character may be situated at any suitable point along the line of the tramway. It is supported from the ground, or from the stationary platform H' upon the ground, and shown in Fig. 19. A car or truck is supported upon the rail H, each car or truck being constructed of a plate or frame-work, I, carrying wheels I', which engage with the track at H, and carrying also a wheel or roller, J, which lies below and in contact with the under side of the cable $A^2$. From each of these cars or trucks $I^4$ there extend downwardly legs or hooks I', there being preferably two or more of these upon each side of the tramway. At the lower ends these hangers or legs $I^2 I^2$ are all united to a platform, R, and it will be seen that as the cars or trucks I I' on the two sides of the tramway are drawn in one direction or the other the platform R will be moved accordingly.

In order to steady the platform R in its reciprocations, I prefer to provide it with guide-rollers Q, Figs. 18, 19, and 20, upon its under side, which fit and move in a way, Q', formed by means of parallel bars, or otherwise, on the ground or stationary platform H'. This platform R is adapted to receive passengers or freight, and adapted also to be temporarily engaged with the cab or carriers that are being transported by the main cable, and while they are thus temporarily united with the latter the freight or passengers can be readily transferred from the platform to the cab or carriage.

The connecting of the platform with the cable and the carrier propelled by the cable and the disconnecting are effected by the following devices: The car I I' carries a rocking bar or arm, K, having at one end an arm, L, it being mounted in bearings at $k'$. It can slide to some extent in these bearings, and between them is situated a sufficiently strong coiled spring, $k^2$, bearing against a collar at $k^3$, which tends to return the bar or shaft K into the position in Fig. 25, and therefore at the instant the engagement is made between the car or platform I, together with its platform R, no serious shock is experienced, as the force is overcome by the spring $k^2$. The engagement is effected by having the outer end of the lever L lie across the path of the clips on the cable. When one of the latter strikes the lever L, the car I I', adjacent to the clip, (together with the car or truck on the opposite side of the tramway,) is moved, and the platform below of course is moved with it. When the motion is being imparted to the platform, the cab or carriage is preferably in substantially the position shown in Fig. 18, so that a person can readily step from the platform to the car, or freight can be easily loaded from one to the other. The cab or carriage is held properly relatively to the platform by means of guide-rollers O and a way formed by guide-rails, or otherwise, and secured to the ground or body platform H', as shown in Figs. 18 and 19. At the time the clip of the cab or carriage comes in contact with the lever L the cab is positively locked to the platform R by means of a gib or stirrup, U, carried by the cab, the opening in which receives the point $s^2$ of a locking-plate, S, the latter being pivoted to the platform R. Until the plate S is swung around so as to disengage its point $s^2$ from the gib or stirrup U the lower part of the cab and the platform will be held firmly together. Of course it is necessary, after the loading of the cab has been effected, to disengage the platform R therefrom, and this is accomplished as follows:

M represents a cam or inclined track the lower end of which is so situated that the lever L, as it moves over it, (the cam or track M,) will be lifted up. The upward rising of the end of lever L continues until the clip on the cable passes under it, the lever L being left suspended in its upper position on top of the cam-track M, and therefore the clips can one after another pass by. By arranging the arm L, which effects the connections between the continuously-traveling carrier and the reciprocating carrier, so as to rise and fall—that is to say, so as to move in planes transverse to the path of the cable and to the path of the clips carried thereby—it (said arm) can be readily disengaged by hand if for any reason there should be a failure on the part of the cam-track or bar M to produce the disengagement. At the same time that this occurs with the devices at the top a disengagement is effected at the bottom as follows: The lock S is connected by a system of toggle-levers, V', and connecting-rod N with the lever L. The toggle-levers are connected, one by swivel-joints at Y with the platform R, and the other by a pin and ball and socket at X with the plate S. The connecting-rod N is joined at V to the pivot which unites the toggle-levers V' V'. When there is an upward pull upon the rod N, the pivot at V is drawn up and the plate S has its point or toe $s^2$ drawn back out of the gib or stirrup U, so that the cab is released at the bottom from the platform R. This upward movement of the rod N necessary to release the cab at the bottom is effected when the lever L is thrown up by the cam or track M, as will be seen by examining Fig. 19. Therefore the cab or carriage P and its clips are simultaneously released from the platform R and the truck I.

For returning the locking part S, I have shown one of the forms of mechanism which may be used. S' is a coiled spring around a bar, S². The latter is pivoted to the part S, and passes through a standard or other suitable support, as at S⁴, which may be swiveled to the platform, or may have an aperture sufficiently large to permit the necessary movement of the bar S². The spring bears against a pin or stop, s⁴. When the rod N is released from the upward strain, the spring draws the part S back into position, the toggle-levers falling, so as to prevent it from again yielding until said levers are drawn up.

To prevent any backward motion of the cab after the gib or stirrup U strikes the lock S, I employ a supplemental stop, as at t², which is brought to bear against the gib or stirrup on the side opposite the lock. As shown, this stop t² is formed upon or carried by a flat spring, T, the long arm of which lies across the path of the gib or stirrup U, so that the latter in its movement thrusts the spring back until it (the gib U) reaches the lock S, at which time the spring forces the part t² behind the gib, and the latter is held firmly in position.

So far as this part of the invention is concerned it will be seen that the motion of the platform depends upon an intermittent engagement therewith of the cable directly or indirectly. As shown, the engagement is effected by means of the clips, which, however, so far as pertains to this function, may be considered merely as projections or enlargements of the cable. For the successful operation of the mechanism in this respect the projections need not be, as shown, the supporting means for the pendants or carriers, although for many reasons it is preferable to have these clips or connecting devices for the pendant so arranged as that they shall also operate to connect the cable with the carriage.

After the platform has been carried to one end of its throw, it remains there until a clip or other suitable engaging device on the other strand of the cable comes in engagement with the car or upper part of the reciprocating device, whereupon the platform will be returned to the other end of its throw, the devices which act to do this being constructed and operating in a manner substantially similar to that above described.

I have herein spoken of the arm L as lying "across the path of the cable," meaning to be understood thereby that it lies within the path of some of the traveling devices carried by the cable.

Having shown and described one of the forms of apparatus embodying the various features of my invention, I do not limit myself to all the details of the apparatus, for to one skilled in the art it will be apparent that in many respects the spirit of the invention may be preserved although the details of the specific apparatus be varied.

I do not in this application claim any of the combinations claimed in my application No. 138,584, filed July 23, 1884, or No. 129,626, filed April 20, 1884, but reserve to myself the right to claim therein the matters shown and described therein and not herein claimed.

What I claim is—

1. In a cable tramway, an elevated cable and a carrying receptacle below the cable, in combination with a clamp rigidly secured to the cable, a depending support connected with the lower receptacle, and a joint between the cable-clamp and the said pendant, having two axes, arranged substantially as set forth.

2. In a cable tramway, the combination of an elevated cable, a carrying-receptacle below the cable, a clamp rigidly secured to the cable and projecting upwardly therefrom, means for supporting the carrying-receptacle, and a joint between the supporting means and the upwardly-projecting clamp, said joint having two axes arranged relatively to each other, substantially as set forth.

3. In a cable tramway, the combination of the elevated cable, an upwardly-projecting clamp or clip, a support extending downward from the clamp or clip and adapted to carry a receptacle or material below, and a joint between said support and the clamp or clip, having two axes arranged relatively to each other, substantially as set forth.

4. In a cable tramway, the combination of a cable, a clip or clamp firmly secured to the cable, a stud or shaft secured to the clip or clamp loosely, whereby it can rock relatively thereto, and a pendant loosely connected to said stud or shaft, whereby it is adapted to swivel relatively thereto, substantially as set forth.

5. In a cable tramway, the combination of the cable, the clip or clamp rigidly secured to the cable, an arm or shaft mounted in the said clamp or clip and having an expanded bearing in the clamp or clip, and a pendant adapted to carry material or a receptacle below, substantially as set forth.

6. The combination of the cable, the clamp or clip secured rigidly thereto, the stud or shaft mounted within the clamp or clip, the wheel or disk secured to the stud or shaft, and situated within the clamp or clip, a plate arranged to bear against the rear face of the wheel, a plate arranged to bear backwardly upon the wheel to hold it in place, and a pendant secured to or formed with a stud or shaft, substantially as set forth.

7. In a cable tramway, the combination of the cable, the pendant for supporting material or a receptacle below, a plate having a loop which is clamped to the cable, a plate clamped to the aforesaid looped portion, a stud or shaft carrying the pendant, and passing through the second aforesaid plate, and the plate situated behind the inner end of the stud or shaft, the said three plates being arranged, substantially as set forth, to hold the stud or shaft firmly in position relatively to the cable, as described.

8. The combination of the loop or clamp secured to the cable, the stud or shaft $k$, the expanded bearing for said shaft, the sheet-metal plate which lies upon the front side of the said expanded bearing, and the sheet-metal plate which lies upon the rear side, substantially as set forth.

9. A guide for a cable tramway, having two or more independently rocking or rotating pulleys connected together and arranged, substantially as set forth, to rotate together around a common axis, in combination with means for intermittently stopping the rotation of the entire series of pulleys, substantially as set forth.

10. A guide for a tramway-cable having a main rotating frame, a series of two or more wheels arranged to rock or rotate independently upon the said main frame, one or more locks which prevent the rotation of the main frame, and releasing devices lying across the path of the cable for unlocking at intervals the locking devices, substantially as set forth.

11. The combination of a main frame or support adapted to be situated at a bend of a tramway-cable, a series of two or more cable-guides secured jointly to the said main frame or support, and arranged to rock or rotate independently of each other thereon, a stop which prevents the rotation of the main frame or support, means for releasing said stop, and projections secured to the cable for operating the stop-releasing devices, substantially as set forth.

12. A main frame or support adapted to be situated at a bend in a tramway-cable, and carrying a series of two or more projections, which in turn lie in the path of the cable, a shaft or axis about which the said main frame or support can rotate, a stop which prevents the rotation of said frame or support, and means operated by the cable for releasing the said stop, substantially as set forth.

13. A main frame or support adapted to be mounted at the bend of a tramway-cable on an axis transverse to the plane of the cable at that point, and carrying a series of two or more projections in turn lying in the path of the cable, a stop which prevents the rotation of the main frame or support, a lever situated between two of the aforesaid projections, and lying across the path of the cable, and a projection carried by the cable, substantially as set forth.

14. A guide and supporting devices adapted to be situated at a bend of a tramway-cable, it having a main frame mounted upon an axis transverse to the plane of the cable at that point, a stationary stop situated at the center of rotation of the main frame, a sliding bolt carried by the main frame or support, a lever pivoted to the main frame or support and engaging with the said sliding bolt, and having its end arranged to lie at intervals across the path of the cable, substantially as set forth.

15. The combination of the main frame or support adapted to be mounted at a bend in a tramway-cable on an axis transverse to the plane of the cable at that point, and carrying projections which in turn lie in the path of the cable, a stop which prevents the movements of the main frame or support, and a lever pivoted to the main frame or support, and provided with an anti-friction roller which at intervals lies in the path of the cable and engages therewith, substantially as set forth.

16. The combination, with the cable, of a pendant suspended therefrom, an arm secured to the pendant and adapted, substantially as set forth, to loosely support a carrier or receptacle, a lever connected with said arm, and a stationary stop adapted to move said lever, whereby when the latter impinges upon said stop it shall be swung or turned to drop the loosely-supported carrier, substantially as set forth.

17. The combination, with a tramway-cable, of a pendant secured to the cable, an arm connected with the pendant and movable relatively thereto, a carrier-support secured to said arm, and means for automatically turning the said arm to release the carrier or receptacle, substantially as set forth.

18. The combination of the tramway-cable, a carrier or carriage secured thereto, a movable platform, means for automatically uniting the movable platform with the carrier or carriage, and means automatically disconnecting them, substantially as set forth.

19. The combination of a tramway-cable, a car or carriage secured thereto, a movable platform, a stationary track which supports the movable platform, means for automatically connecting the movable platform with the cable car or carriage, and means for disconnecting them therefrom, substantially as set forth.

20. The combination of a tramway-cable, a car or carriage secured thereto, a stationary elevated track, a platform depending therefrom, an arm connected with said platform lying across the cable on one side of the way, a second arm lying across the path of the cable on the other side of the way, and means for disconnecting said arms alternately from the cable, whereby the movable platform is carried in alternate directions, substantially as set forth.

21. The combination of a tramway-cable, a car or carriage secured thereto, a movable platform in the same or nearly the same horizontal plane as the cable car or carriage, an arm carried by the platform and lying across the path of a projection extending outwardly from the cable, it being situated above the movable platform in proximity to the cable, means for automatically connecting the car or carriage with the platform, and means for automatically disengaging them, substantially as set forth.

22. The combination of the tramway-cable, the car or carriage carried thereby, a reciprocating platform, and a guide for the car or carriage, with which guide the latter engages while in proximity to the reciprocating platform, substantially as set forth.

23. The combination of the tramway-cable, the car or carriage secured thereto, a reciprocating platform adapted to be automatically connected with and disengaged from the said car or carriage, and means, substantially as described, for preventing any backward movement of the car or carriage relatively to the platform, substantially as set forth.

24. The combination of the tramway-cable, the car or carriage secured thereto, the movable platform, and a spring which receives the first impact upon the platform from the cable when the car or carriage and the platform are united, substantially as set forth.

25. The combination of a tramway-cable, the car or carriage secured thereto, the movable platform, the devices which connect the cable with the platform at points in proximity to the cable, the devices which effect a connection between the car or carriage and the platform at points below the cable, and means for simultaneously breaking the connection at both places, substantially as set forth.

26. The combination of the tramway-cable, the car or carriage secured thereto, the movable platform, an arm connected with the movable platform and lying across the path of a projection extending outwardly from the cable, the track upon which the movable platform is supported, and a supplemental track inclined relatively to the aforesaid track and lying across the path of the aforesaid arm to effect the disengagement of the platform from the cable, substantially as set forth.

27. The combination of the tramway-cable, the movable platform, a car or carriage secured thereto, the track which supports the movable platform, an arm connected with the movable platform and lying across the path of a projection extending outwardly from the cable, the supplemental locking devices which unite the platform and the car or carriage together, and a bar or rod intermediate between the aforesaid arm and the supplemental locking devices, and arranged, substantially as set forth, to be operated by the said arm to release the latter, as described.

28. The combination of the tramway-cable, a car or carriage secured thereto, a movable platform, a bar or arm carried by the movable platform and lying across the path of a projection extending outwardly from the cable, supplemental locking devices for uniting the car or carriage directly with the platform, and a track or guide for the aforesaid arm inclined relatively to the path of the platform, and connecting means between the said arm and the supplemental locking devices, whereby a simultaneous release of the arm and locking devices is effected.

29. The combination of the tramway-cable, the car or carriage secured thereto, the movable platform, a projection on the car or carriage extending toward the movable platform, a movable stop on the platform against which the said projection impinges, and a movable stop adapted to bear against the side of the projection opposite the first aforesaid movable stop, substantially as set forth.

30. The combination of the tramway-cable, the car or carriage secured thereto, the movable platform, a projection carried by the car or carriage and extending toward the movable platform, the movable stop against which the said projection impinges, a stop adapted to lie behind the said projection, and a yielding support for the last said stop, said support lying in the path of the projection and adapted to be moved thereby, substantially as set forth.

31. The combination of the tramway-cable, the car or receptacle secured thereto, and the movable platform, the stop S, adapted to be impinged upon by the car or receptacle, the toggle-levers for moving the said stop, the rod or link which opens the said toggle-levers, and means, substantially as described, for automatically moving the rod or link.

32. The herein-described means for uniting together the adjacent ends of the cable, it consisting of a block or blocks of metal provided with downwardly-extending loops through which the ends of the cable can be respectively passed inwardly toward each other, in combination with a key or supplemental block, m, adapted to be driven in between the ends of the cable and the block, substantially as set forth.

33. The combination, with the cable, of a guide mounted on a horizontal axis at a bend in the cable, and a stop which intermittingly holds the guide stationary, all of the parts of said guide being situated within the outermost circle described by the rotating parts, whereby an open unobstructed space downward from the cable is provided through which the pendants and carriers can pass freely, substantially as set forth.

34. The combination, with the cable, of a guiding device situated at the bend of the cable, it being a rotating main frame or support provided with a series of several lateral extensions, a stop which intermittingly prevents the rotation of the guide, and a stop-releasing mechanism, the aforesaid lateral extensions of the guide being related, substantially as set forth, to the cable, whereby the guide engages at all times at two or more points with the cable, substantially as set forth.

35. The combination, with the cable and the clip secured thereto, of the rotary guide at a bend in the cable, the lock which intermittingly holds the guide stationary, a lever or arm for opening the lock and moving in a plane parallel to that in which the said clip lies, and a lateral extension carried by said lever and situated transversely to the path of the clip, substantially as set forth.

36. The combination, with the cable, of the shaft $n$, the cam or stop $o$, secured to the shaft, the rotary guiding-frame mounted on the shaft $n$, the lever $q$, and the pin or bolt $p$, adapted to engage with said cam, substantially as described.

37. The herein-described clamp or clip for securing a rocking hanger to a cable, it having a main central plate provided with an aperture adapted to have a loosely-mounted rocking arm inserted therein, in combination with a thin clamping-band which surrounds the cable, and both ends of which are bolted or riveted to the said central plate, substantially as described.

38. The combination of a hanger, $l'$, an arm, $l^6$, connected to the hanger and movable relatively thereto, the arm $l^7$, connected to the said arm $l^6$, and a spring, $l^8$, which holds said arm $l^6$ in its normal position.

39. The combination of a hanger, $l'$, an arm, $l^6$, connected to the hanger, and having a seat for a detachable freight-carrier, G, and an arm, $l^7$, for imparting motion thereto relatively to the hanger, substantially as set forth.

40. The combination of the continuously-traveling carrier, a platform or carrier which intermittingly coincides with the said continuously-traveling carrier, and the rising and falling arm L, which moves in planes transverse to the cable into and out of engagement with the traveling parts, substantially as set forth.

41. The combination of the continuously-traveling carrier, a platform or carrier which intermittingly coincides with said continuously-traveling carrier, the plate S, the lock which intermittingly holds said plate in position, and the rod or bar N, for opening said lock, substantially as set forth.

42. The combination, with a continuously-traveling carrier, and a platform or carrier which intermittingly coincides with said continuously-traveling carrier, of the plate S, the spring S', the rod N, the bar L, and the cam track or bar M, substantially as set forth.

43. The combination of the continuously-traveling carrier, a carrier which intermittingly coincides with said continuously-traveling carrier, the clip $j$, the rising and falling arm L, moving in planes transverse to the path of the clip, and the cam track or bar M, substantially as set forth.

44. The combination, with the continuously-traveling carrier, and the platform or carrier which intermittingly coincides with the continuously-traveling carrier, of the locking-plate S, the toggle-levers V', and means, substantially as described, for moving the toggle-levers to release the plate, as set forth.

45. The combination, with the continuously-traveling carrier, and the platform or carrier which intermittingly coincides with the continuously-traveling carrier, of the locking-plate S, having an arm or projection, $s^4$, the lock which intermittingly holds said plate in position to be engaged by the traveling carrier, and devices, substantially as described, for releasing the locking parts, as set forth.

46. The combination, with the continuously-traveling carrier, and the platform or carrier which intermittingly coincides with said continuously-traveling carrier, of the plate S, the toggle-levers which intermittingly hold said plate stationary, the spring S', which draws the plate into the locked position, and devices, substantially as set forth, which release the lock, as described.

47. The combination of the continuously-traveling carrier, the platform or carrier which intermittingly coincides with said continuously-traveling carrier, a lever or bar, L, permanently connected with one of the aforesaid carriers, and arranged, substantially as set forth, to intermittingly engage with the other carrier, and a cam track or guide, M, in the path of the said lever or bar L, substantially as set forth.

48. The combination of the continuously-traveling carrier, the platform or carrier which intermittingly coincides with the said continuously-traveling carrier, the lever or bar L, and a spring, $k^2$, arranged, substantially as set forth, to resist the movement of the lever or bar L, as described.

49. The combination of the continuously-traveling carrier, the platform or carrier which intermittingly coincides with said continuously-traveling carrier, the connecting lever or bar L, arranged, substantially as set forth, to both rock and slide in the direction of the axis on which it rocks, and the spring $k^2$, which resists the sliding motion, substantially as set forth.

50. The combination of the continuously-traveling carrier, the platform or carrier which intermittingly coincides therewith, a lever or bar, L, which intermittingly connects the two carriers, a movable frame connected to the second aforesaid carrier or platform, and a stationary frame having a bar, H, which engages on two lines with the movable frame, substantially as set forth.

CHAS. M. HUSON.

Witnesses:
E. S. McKINLAY,
W. L. JOHNSON.